US011481371B2

(12) United States Patent
Watkins et al.

(10) Patent No.: US 11,481,371 B2
(45) Date of Patent: Oct. 25, 2022

(54) STORAGE SYSTEM CAPACITY USAGE ESTIMATION

(71) Applicant: Hewlett Packard Enterprise Development LP, Houston, TX (US)

(72) Inventors: Glenn Watkins, Westborough, MA (US); Peter Madany, Southborough, MA (US); John Czerkowicz, Wakefield, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 127 days.

(21) Appl. No.: 16/939,234

(22) Filed: Jul. 27, 2020

(65) Prior Publication Data

US 2022/0027334 A1 Jan. 27, 2022

(51) Int. Cl.
*G06F 16/22* (2019.01)
*G06F 16/23* (2019.01)
*G06F 16/215* (2019.01)

(52) U.S. Cl.
CPC ........ *G06F 16/2246* (2019.01); *G06F 16/215* (2019.01); *G06F 16/2379* (2019.01)

(58) Field of Classification Search
USPC ........................................................ 707/692
See application file for complete search history.

(56) References Cited

U.S. PATENT DOCUMENTS

| | | | | |
|---|---|---|---|---|
| 7,720,892 B1 * | 5/2010 | Healey, Jr. | .......... | G06F 11/1456 707/831 |
| 7,930,559 B1 * | 4/2011 | Beaverson | .......... | G06F 11/1453 713/193 |
| 8,595,239 B1 * | 11/2013 | Yadav | ................. | G06F 16/9014 707/747 |
| 10,192,207 B1 | 1/2019 | Auchmoody et al. | | |
| 10,331,350 B1 | 6/2019 | Kucherov et al. | | |
| 10,459,648 B1 | 10/2019 | Guilherme et al. | | |
| 11,016,955 B2 * | 5/2021 | Tofano | .................... | G06F 16/22 |

(Continued)

FOREIGN PATENT DOCUMENTS

CN 107368545 B 8/2019

OTHER PUBLICATIONS

Hamik et al., "Sketching Volume Capacities in Deduplicated Storage", 17th USENIX Conference on File and Storage Technologies, Feb. 25-28, 2019, 15 pages.

(Continued)

*Primary Examiner* — Cam Linh T Nguyen
(74) *Attorney, Agent, or Firm* — Trop, Pruner & Hu, P.C.

(57) ABSTRACT

Techniques and architectures to estimate storage system capacity are disclosed. Deduplicated data and an index of object entries are maintained in a storage system. The entries contain shallow reference counts. The shallow reference count values indicate a number of parent metadata objects that hold a reference to corresponding object. One or more tree milli-indices and one or more node milli-indices of object entries are maintained in the storage system. The entries correspond to a subset of objects stored in the storage system. The entries also have truncated object signature values and deep reference count values for the corresponding objects in the storage system. A capacity utilization of the storage system is determined based on analysis utilizing the deep reference count values to perform various multiset operations.

21 Claims, 9 Drawing Sheets

(56) References Cited

U.S. PATENT DOCUMENTS

2017/0257254 A1    9/2017   Petri et al.
2019/0392048 A1   12/2019   Shatsky et al.

OTHER PUBLICATIONS

Anil Kumar and Chirag Kulshreshtha, "Merkle Based Cryptographic Tree for Preventing Hash Collisions in Data Deduplication Mechanism on Servers," ICAESMT-2019, May 17, 2019, pp. 1-7.

* cited by examiner

STORAGE SYSTEM CAPACITY USAGE ESTIMATION

BACKGROUND

Many complex computing environments utilize distributed computing resources along with distributed storage resources. These complex computing environments require high levels of interconnectedness and optimization. One set of strategies relates to deduplication of data within the storage resources.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
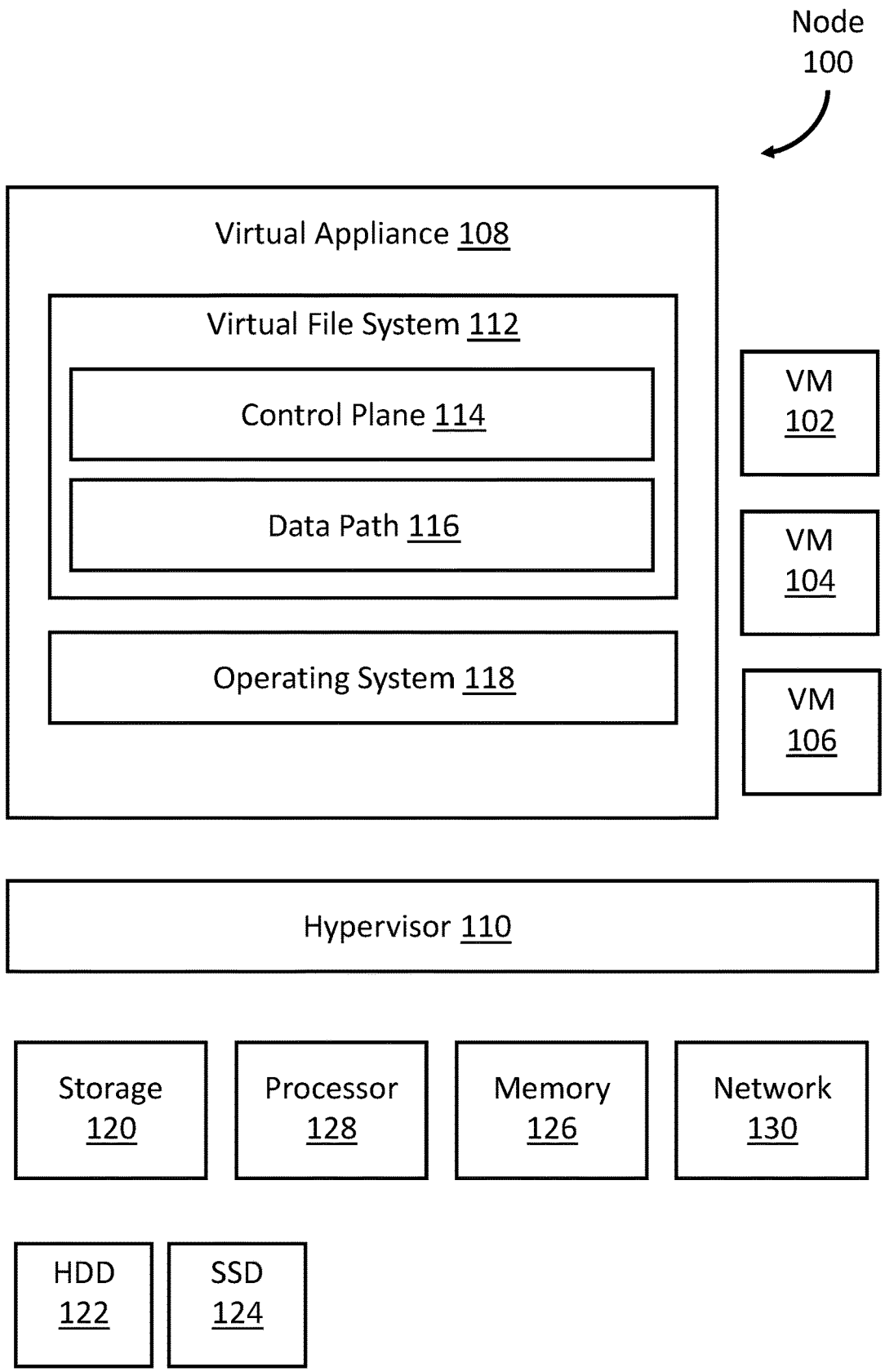
FIG. 1 is a schematic block diagram of one embodiment of a node.

In the following description, numerous specific details are set forth. However, embodiments of the invention may be practiced without these specific details. In other instances, well-known structures and techniques have not been shown in detail in order not to obscure the understanding of this description.

As used herein an "object" is a block of data of a known size that can be uniquely identified by a "signature" that is derived from a cryptographic digest of the data itself, the type of object and the size of the object. In alternate embodiments, the definition of the signature can also include the algorithm used to calculate the cryptographic digest. That is, the signature can include the cryptographic digest, the algorithm used to calculate the cryptographic digest, the size of the object and the type of object.

An "object record" is a data structure that associates an object signature with a reference count and a physical location where the associated data is stored. An "index" is a data structure that provides an associative mapping of signatures to object records. An "object store" maps object signatures to object data through access to the index and the disk(s) where the data is stored.

In the example systems described herein, a file system can contain at least two types of objects: 1) data objects that contain opaque user objects and 2) metadata objects (also called hnode objects) that contain the object signatures of child objects in a tree structure. The file system can be organized as a tree structure. In various embodiments, file system "inodes" are mapped to file/directory content via "inode hnodes" that can represent either a file or a directory.

The root of the file system tree can be referred to as the "file system root hnode" having a signature referred to as the "root object signature."

In some embodiments, the top N levels of the file system tree are the "imap tree" that provides a mapping of inode numbers to inode hnode signatures by indexing into the signatures stored in the leaf nodes of the imap tree. An inode hnode can contain three signatures: 1) a signature of a data object containing attributes; 2) a signature of a data object containing extended attributes; and 3) a signature of the inode root hnode. The leaf nodes of the tree rooted at the inode root hnode provide the data of the file or directory associated with the inode.

As discussed above, data may be stored on various types of computing systems, such as servers, computer appliances, workstations, storage systems or storage arrays, converged or hyperconverged systems, or the like. Computing systems connected by a network may be referred to as nodes. To store data, some computing systems may utilize a data virtualization platform that abstracts aspects of the physical storage hardware on which the data is physically stored (e.g., aspects such as addressing, configurations, etc.) and presents virtualized or logical storage to a user environment (e.g., to an operating system, applications, processes, etc.). The virtualized storage may be pooled from multiple storage hardware (e.g., hard disk drives, solid state drives, etc.) into a data store, out of which the virtualized or logical storage may be provided. The data virtualization platform may also provide data services such as deduplication, compression, replication, and the like.

Components of an example object-based data virtualization platform may include a flat object store and one or more file system instances, among other things. Data may be stored as objects in the object store. For example, user accessible files and directories may be made up of multiple data objects. The object store may also store metadata objects related to the operation of the data virtualization platform, as will be described below. In an example, objects may be of a predetermined fixed size in the object store (e.g., 4 kb or 8 kb for data objects and 1 kb or 2 kb for metadata objects). Each object may be identified by its signature (also referred to as an object fingerprint). An object index can correlate the signature of an object in the object store to a physical address of the object's content (i.e., a physical address on storage hardware such as disk).

A file system instance may refer to an organization of metadata objects and data objects that relate the data objects hierarchically to the root object. Thus, a file system instance may be identified by its root object. For example, the file system instance may be a Merkle tree or any other hierarchical arrangement (e.g., directed acyclic graphs, etc.). In the case of a hierarchical Merkle tree, data objects may be located at the lowest tree level of any branch (that is, most distant from the root object) and may also referred to as leaf data objects. A parent object includes as its content the signatures of child objects. For example, a parent object of leaf data objects is a metadata object that stores as its content the signatures of its child leaf data objects. The root object and other internal objects of a tree may also be metadata objects that store as content the signatures of respective child objects. A metadata object may be able to store a number of signatures that is at least equal to a branching factor of the hierarchical tree, so that it may hold the signatures of all of its child objects.

A consequence of data deduplication may include a reduction in the information related to capacity utilization. Another consequence may be a difficulty in estimating resources that can be freed up by deleting (or moving) one or more data sets from a storage system and the difficulty in estimating resources that would be consumed by moving one or more data sets to a second storage system Described herein are techniques for storage system capacity estimation based on sampling, signatures and deep reference counts. More particularly, embodiments relate to techniques estimating capacity consumption for storage systems using shallow reference counts to support data management and deduplication including, for example, sampling, deep reference counts, and multiset operations. In various embodiments, Merkle trees can be utilized with shallow reference counts that are incremented/decremented only at the level where sharing occurs.

In example implementations, data of one or more guest virtual machines may be stored by one or more file system instances (e.g., one guest VM using storage from multiple file system instances, many guest VMs using storage from a single file system instance, or any variation in between). In an example, each guest virtual machine may be associated with a respective file system instance on a one-to-one basis. The data virtualization platform may export a file protocol mount point (e.g., an NFS or SMB mount point) by which a guest virtual machine can access the storage provided by a file system instance via the namespace of the file protocol.

In some implementations this guest access is via a vSCSI layer provided by a hypervisor, which maps SCSI operations to file operations. In other implementations, a file system instance may be associated with and accessed for other units of storage, such as a block volume, a network attached storage share, a container volume, etc. In some implementations, objects in an object store may be referenced more than once in a single file system instance or may be referenced multiple times in file system instances. Thus, the multiply referenced object can be stored once but referenced many times to provide deduplication.

FIG. 1 is a schematic block diagram of one embodiment of a node. Node 100 can be, for example, a hyperconverged infrastructure node with a software-centric architecture that tightly integrates compute, storage, networking and virtualization resources and other technologies. Node 100 can host any number of guest virtual machines (VMs) 102, 104 and 106, and can be configured to produce local and remote backups and snapshots of the virtual machines. In some examples, a plurality of such nodes may be arranged in a network as described below.

In some examples, node 100 can include virtual appliance 108 and hypervisor 110. Virtual appliance 108 can include virtual file system 112 in communication with control plane 114 and data path 116. Control plane 114 can handle data flow between applications and resources within node 100. Data path 116 can provide a suitable I/O interface between virtual file system 112 and operating system (OS) 118, and can also enable features such as data compression, deduplication, and optimization.

Node 100 can also include hardware components managed by hypervisor 110. For example, node 100 can include storage 120 which can be a RAID storage controller or a host bus adapter having connections to a number of hard disk drives (HDDs) 122 and/or solid state drives (SSDs) 124. Node 100 can also include memory 126 (e.g., RAM, ROM, flash, etc.) and one or more processors 128. Node 100 can also include wireless and/or wired network interface components 130 to enable communication with other nodes. In some embodiments, nodes can also include an accelerator card, which can provide compute offload and/or non-volatile RAM (not illustrated in FIG. 1).

Figure 2:
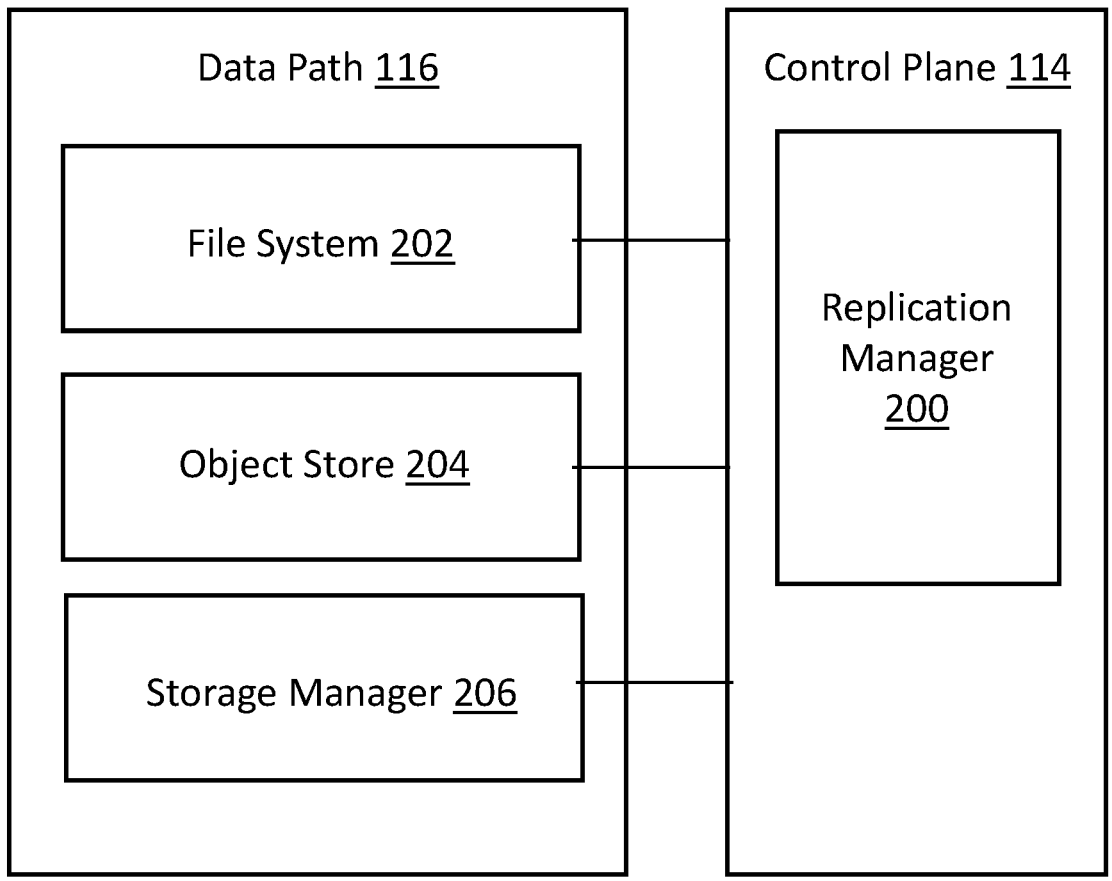
FIG. 2 illustrates an example embodiment of a data path.
Figure 2:
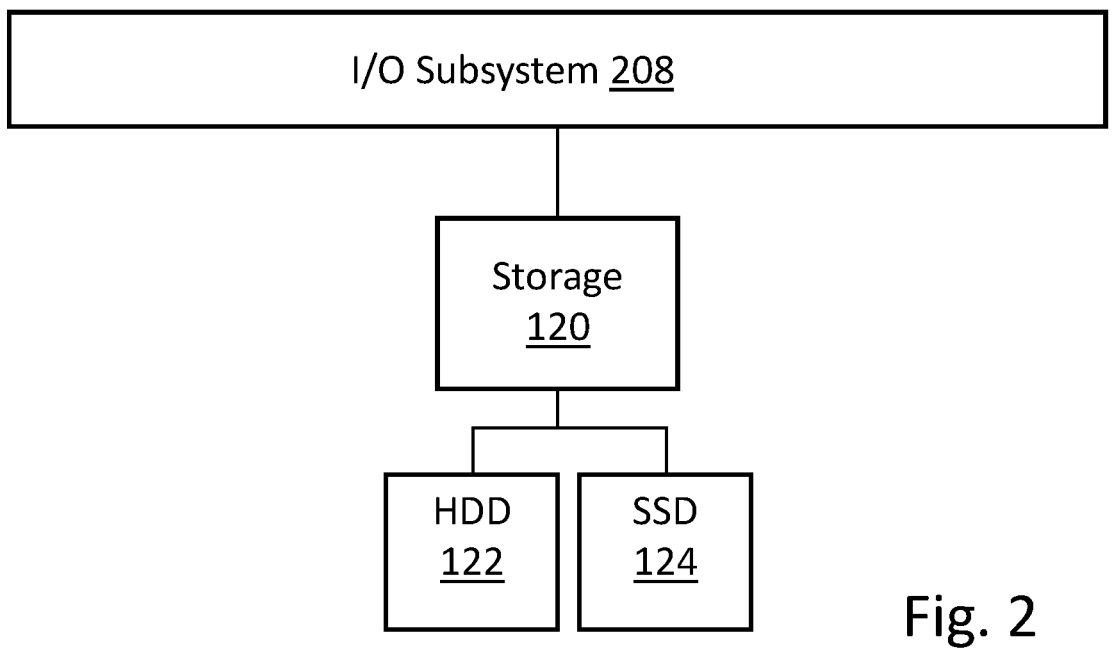

FIG. 2 illustrates an example embodiment of a data path. In various embodiments, data path 116 may communicate with replication manager 200 configured to perform at least remote backup operations. Data path 116 can also include file system 202 in communication with control plane 114. In one embodiment, file system 202 is responsible for managing file system components within data path 116 such as by instantiating file system components, maintaining directories and files within those directories, and the like.

File system 202 may also determine I/O processing capabilities of the node, and implement high availability by, for example, mirroring data writes from the primary node (e.g., node 100) to a secondary node. File system 202 further provides both synchronous and asynchronous data transfer interfaces for various components within data path 116. Object store 204 and storage manager 206 are responsible for data object I/O operations between data path 116 and I/O subsystem 208.

Figure 3:
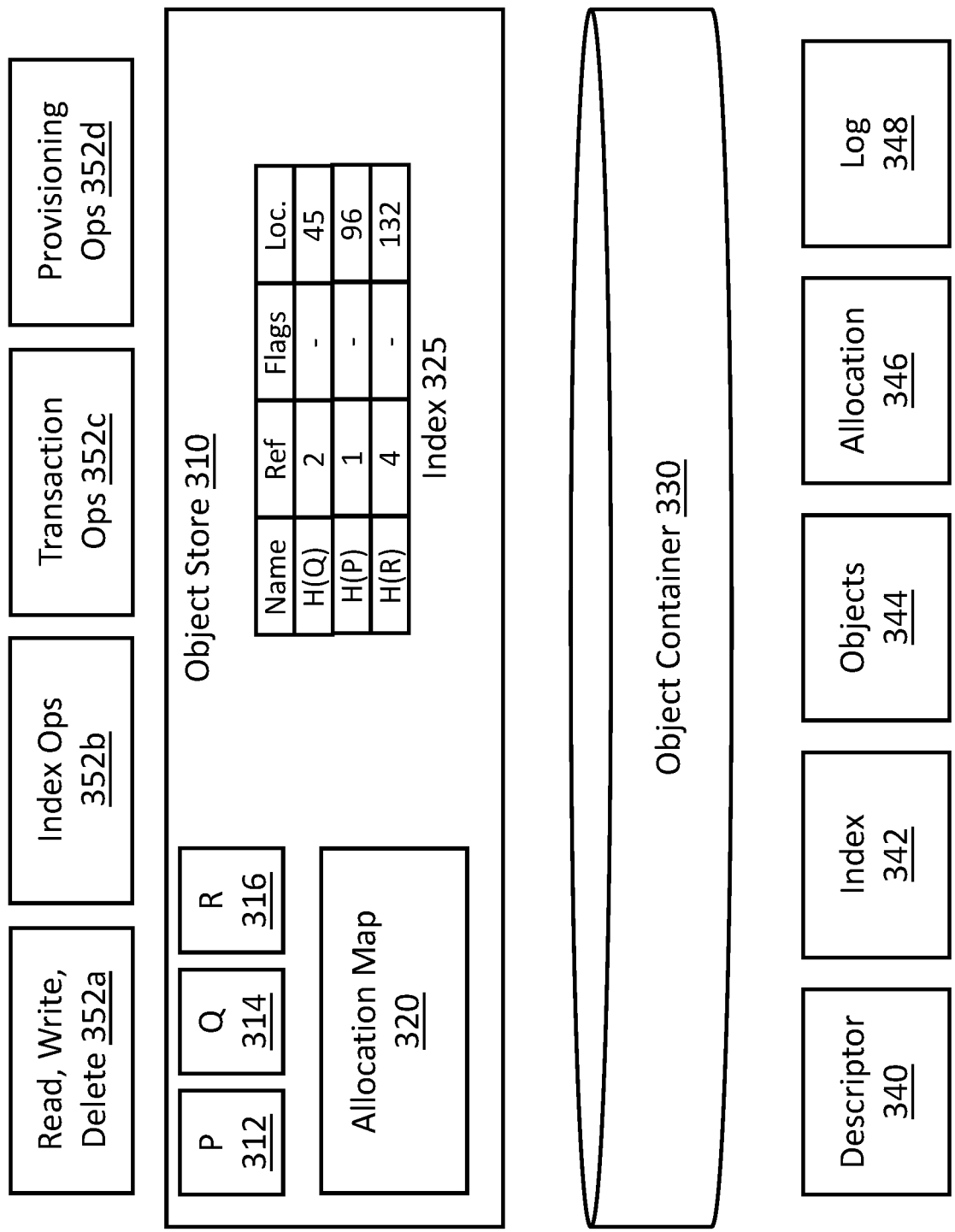
FIG. 3 illustrates one embodiment of an object store.

FIG. 3 illustrates one embodiment of an object store. In one embodiment, object store 310 contains binary, opaque objects, examples of which are P 312, Q 314 and R 316, respectively. Objects may be of varying size, although in a one implementation they are powers of 2. An object resides at some offset in the container, which may be a byte offset, or an offset modulo the smallest object size (i.e., if the smallest object is 512 bytes, then the offset would be multiplied by 512 to get the byte offset).

As discussed above, each object has a name, referred to herein as a signature (or fingerprint), which is a cryptographic digest (e.g., hash) of the object contents. For example, the object names (signatures) are denoted by H(p), H(q) and H(r). In this manner, each object, which can include data and/or metadata, can have a globally unique signature derived from the content of its data.

In the example of FIG. 3, index structure 325 keeps track of (maps) object names, object locations, and object references. In this deduplicated file system and object store, a single copy of each unique data or metadata object may be stored, identified by its signature. An object's reference is incremented every time the object is written. In other words, while the file system may generate many "copies" of the same object, object store 310 may store only one and keep track of how many the namespace has and the corresponding mapping. In doing so, deduplication is native to the system.

Object store 310 can have several interface classes 352a-d. Read, write, delete interface 352a performs the stated functions. In this context, an object deletion is functionally a decrement of the object's reference count. Storage for the object inside the object store is released when the reference count goes to 0. Indexing operations 352b enable enumeration of objects by name, reference count adjustments, and looking up of objects by name. Object store 310 has transactional semantics (ACID properties), and transaction boundaries are managed through transactional operations 352c. This includes starting, committing and aborting a transaction, in addition to listing of pending transactions. Provisioning interface 352d enables object stores to be created, deleted, merged, split and aggregated.

In one embodiment, index 325 is a map whose primary key is the object name (signature). There is an index entry for every object in the system. In one embodiment, each entry contains at least: 1) a signature of the object's content (signatures are generated, for example, by a cryptographic digest (hash) of the content); 2) a reference count indicating how many times the object is referenced; 3) a location; and 4) flags for various uses.

In one embodiment, the reference count can use saturating arithmetic to save space. For example, index 325 may only use 8 bits to track references: the reference count can be added and decremented, but if it equals or exceeds 255, the count "saturates", and no further decrements are allowed. Because objects have reference counts, to the extent there are identical objects, deduplication is native to the system. If the object is on a physical disk, the location may be a logical block number LBN. If the object is hosted by a hosting provider (e.g., Amazon S3), then it can be a reference to the cloud object. One flag indicates if the object is stored compressed or not, another if encrypted or not. Other flags are available but are not allocated to a specific use.

In one embodiment, allocation map 320 is a bitmap used for allocated blocks on object container 330. Object container 330 is a randomly addressable persistent storage abstraction. Examples include a raw LUN, a file, a partition on a disk, or an iSCSI device across a Local Area Network (LAN) or a Wide Area Network (WAN) (i.e., a telecommunications network or computer network that extends over a large geographical distance, such as a distance greater than 60 miles). Object container 330 can have several components 340-348. Aside from the container descriptor block 340, which resides at a known offset, the order of the other components is not material. Object index 330 may have container resident portions, or portions of index 325, or both, such as a B-tree or another tree structure. Allocation map 320 also may be partially on disk and in index 342. Migration between the two can be accomplished with paging techniques.

As the object store is modified, transaction log 348 is kept on persistent storage. Transaction log 348 tracks all object activity, including reads, writes, deletes, reference adjustments, and so forth. In one embodiment, transaction log 348 is kept in time order, and is periodically rolled into main index 342. In one embodiment, object activity in the log is searched first before searching the main index. Each log entry consists of an operation type 352a, 352b, 352c, 352d, the fingerprint, reference count, transaction ID or epoch number, and location. A log entry is structurally similar to an index entry, with the addition of the transaction ID.

Global object naming enables the object store to move objects around while still preserving consistent naming and access. Example reasons for moving an object include: 1) moving related objects close to each other on a physical disk, for performance reasons; 2) replicating objects across fault boundaries (e.g., across two local disks, a local disk and a remote disk, or any multiple thereof); 3) background operations on objects such as compression, decompression, encryption, decryption; or 4) moving objects based on their frequency or expected frequency of use. Replication can also confer read performance benefits. Replication can also include splitting objects, such as with erasure codes.

As mentioned above, use of deduplication techniques in storage systems results in unique management challenges as compared to non-deduplicated systems. Basic capacity information like available storage capacity is not easily determined in deduplicated systems like it is in non-deduplicated systems. Most statistics available in non-deduplicated systems are additive (or can be derived from additive statistics). For example, the storage capacity in use can be incremented or decremented with each transaction to maintain useful information. In deduplicated systems moving a dataset from one node to another can result in previously unpredictable and possibly unequal capacity changes to each node, for example, the amount of space reclaimed in the first node could be less than, equal to, or more than the amount of space consumed in the second node.

Utilizing techniques described herein useful storage system information including, for example, how much capacity can be regained from various actions (e.g., how much space can be freed if a dataset is removed from a node (the "reclaimable space" of the dataset with respect to the node in which it is currently stored). Other similar sorts of statistics can also be supported.

In various embodiments, shallow reference counts are utilized to generate statistics to be used for storage system management. The term "shallow reference count" refers to a signature's count of the number of parent metadata objects that hold a reference to the object and not how many trees hold a reference to the object nor how many times an object occurs within a file or filesystem. Determining whether an object is unique to a given tree can require walking the tree to determine whether any parent object in the path to the root would not have a reference count reduced to zero by deleting the tree. In one embodiment, this overhead can be avoided by maintaining a separate data structure with deep reference counts of only sampled objects.

In some embodiments, milli-indices can be utilized at application, hive or node levels, and can be treated as multisets. Multiset operations that predict changes in storage consumption based on various data set operations (e.g., moving data from one node to another, deleting one or more data sets) can be supported. The term "hive" refers to a dataset comprising data and an associated tree structured file system, as described above. A hive may also be referred to herein as a file system instance.

In some embodiments, a milli-index resembles the indices discussed above except that: 1) the milli-index only stores signatures that represent a small number of possible object signatures (e.g., using sampling techniques such as the first N (e.g., 13, 15, 9) bits of the hash are clear); 2) only a subset of each signature (e.g., only the first M (e.g., 64, 32, 128) bits); and 3) deep reference counts are maintained. These deep reference counts may be sized (e.g., 32 bits) to any expected amount of redundancy within the system (e.g., up to 4 billion logical occurrences of the same object).

As one implementation example, in a hive with 1 TiB ($2^{40}$ bytes) of non-zero data, all unique, where N=13 and M=64, and the size of a data object is $2^{13}$ bytes, i.e. 8 KiB, the milli-indices contain approximately $2^{(40-(13+13))}$ signatures or approximately 16K entries. The reduced-size signatures themselves should consume approximately 128 KiB while the deep reference counts should consume an additional 64 KiB.

In some embodiments, each milli-index can be persisted in order to avoid regenerating the milli-index for each request and satisfy real-time capacity estimates. In some embodiments, incoming write operation generate intent log entries to track updates to the hnode tree structure. This avoids the need to update the Merkle tree structure all the way to the root of the tree at the time of the initial write. This process of asynchronously applying intent log entries to the Merkle tree can be referred to as the Merkle tree "rollup."

In some embodiments, milli-indices are only utilized with deep reference counts for the bottom-most level of the Merkle tree. In some embodiments, when the rollup process occurs at this lowest level there is an additional step to update the tree milli-index for any data objects that meet the sampling criteria. This includes both incrementing the reference count for sampled signatures being written and decrementing the reference count for sampled signatures being overwritten. This can be done as an atomic operation to ensure the consistency of the milli-index(es) with respect to the contents of the storage system in the event of a failure (e.g., software crash or power interruption). In some embodiments, the milli-index(es) may also be represented as Merkle trees with sampled signatures and their reference counts being at the lowest level of the tree. Intent logs can be used as the mechanism to provide atomic updates to the milli-index(es).

In some embodiments, by storing each tree milli-index as a file/inode within the corresponding hive tree itself, a snapshot of the hive will capture the milli-index that represents the samples of that individual tree snapshot. A snapshot operation can also update the node milli-index for each sampled object contained with that snapshotted tree. This can be done by incrementing the node milli-index record reference counts by the amount represented within the snapshot tree milli-index. Conversely, deleting an existing snapshot can result in the tree milli-index being subtracted from the node milli-index.

Thus, in some embodiments, in response to a snapshot request, outstanding intent log entries are rolled up for the outstanding intent log entries for the tree. The result is a static tree with stable milli-index(es). The tree milli-index(es) are added to node milli-index(es) to account for additional deep reference counts. A milli-index may itself be represented as a tree that, at the lowest level, contains the sampled object signatures. In some implementations, the milli-index root signature reference count can be persistently incremented in a deferred manner, as described in U.S. Pat. No. 10,587,454 granted Mar. 10, 2020 to Watkins et al, in a way to propagate the full deep reference counts of the sampled signatures contained therein to the node milli-index(es). This is one technique to provide a complete snapshot.

Figure 4:
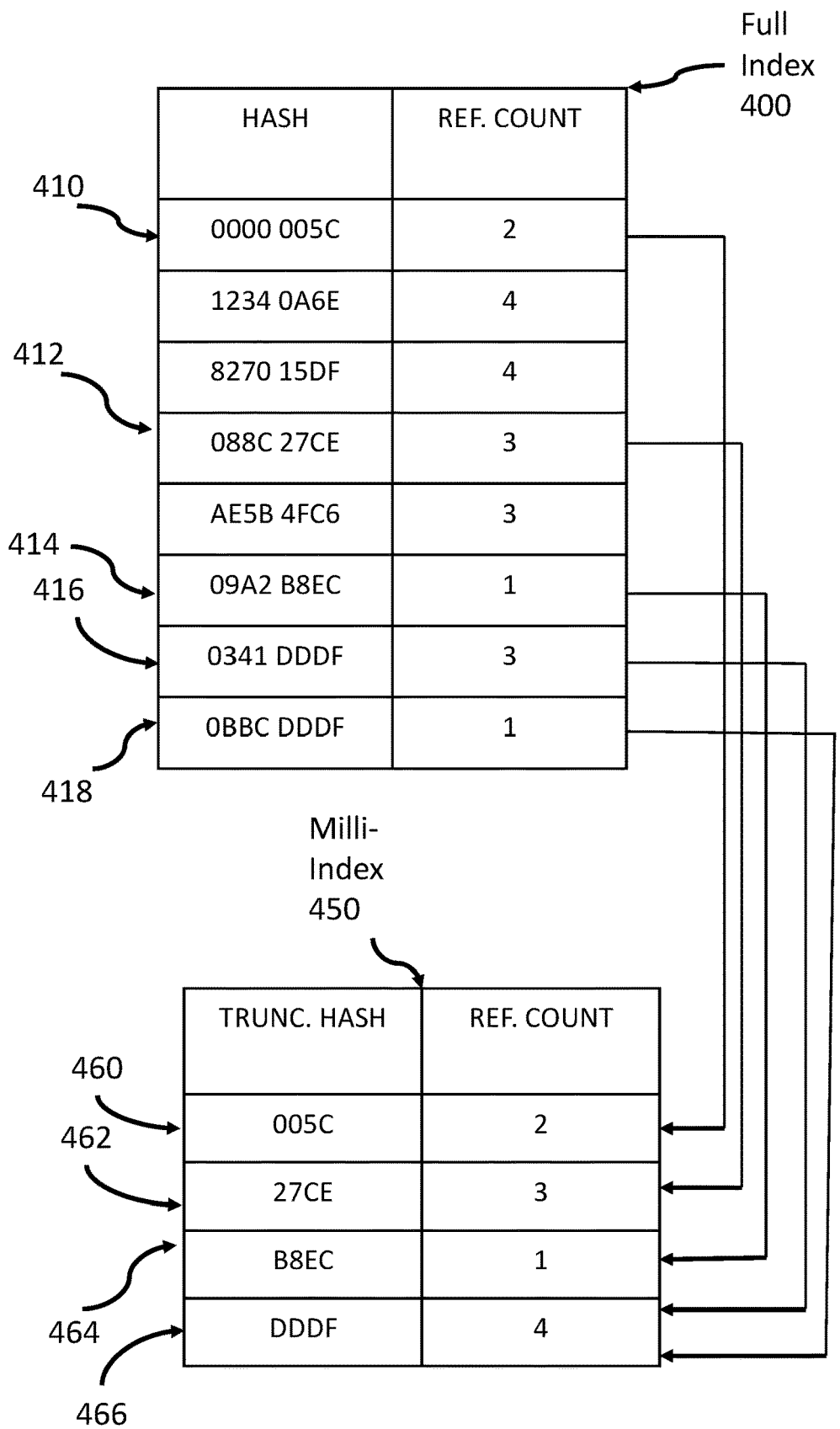
FIG. 4 is a conceptual illustration of a mapping from a full index to a milli-index.

FIG. 4 is a conceptual illustration of a mapping from a full index to a milli-index. In some embodiments, a full index (e.g., 400) can exist on each node and function to track object records using a shallow reference counting strategy. This strategy can be optimized for deduplication at high levels of the Merkle tree to reduce system overhead associated with updating each object index record at lower tree levels.

This same index can be used to track node-level deep reference counts for milli-index (e.g., 450) purposes. When used as a common structure for all object record persistence, full index 400 can store shallow reference counts for metadata objects and unsampled data objects. In some embodiments, full index 400 can be fully persistent and corresponding milli-index 450 structure can be treated as a partial cache of full index 400 that only tracks the samples needed for capacity estimation functionality.

In some embodiments, when a sampled object record (e.g., 410, 412, 414, 416, 418) in full index 400 is updated the corresponding record (e.g., 460, 462, 464, 466) in milli-index 450 is also updated. In the example of FIG. 4, any hash with a leading zero in full index 450 qualifies for milli-index sampling. In the event of a collision (e.g., 416, 418) when truncating the hash, both records can be merged (e.g., 466) in the milli-index to account for the total added reference counts.

Figure 6A:
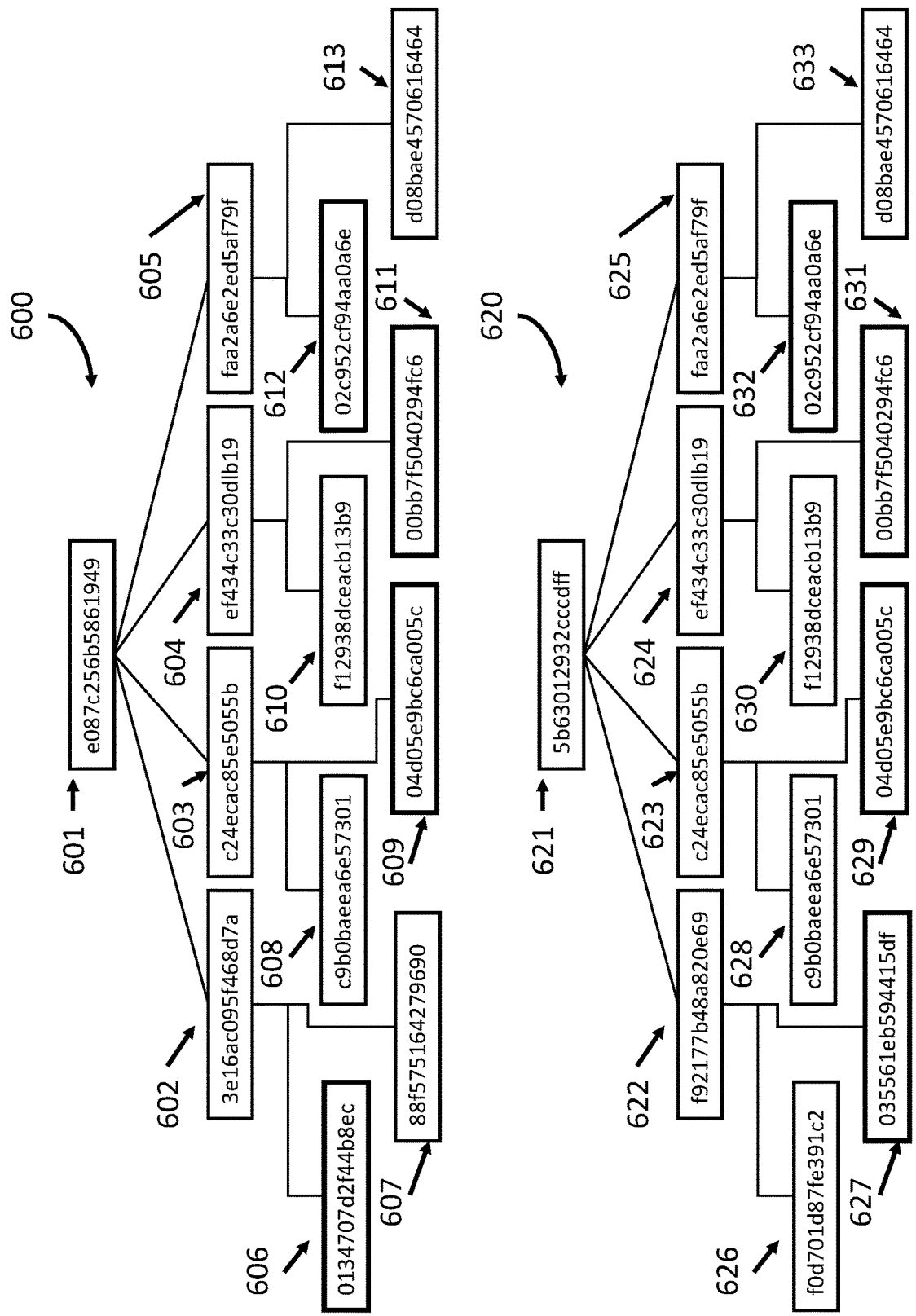
FIGS. 6A-6C provide conceptual illustrations of example trees that can be the basis of corresponding milli-indices.
Figure 6B:
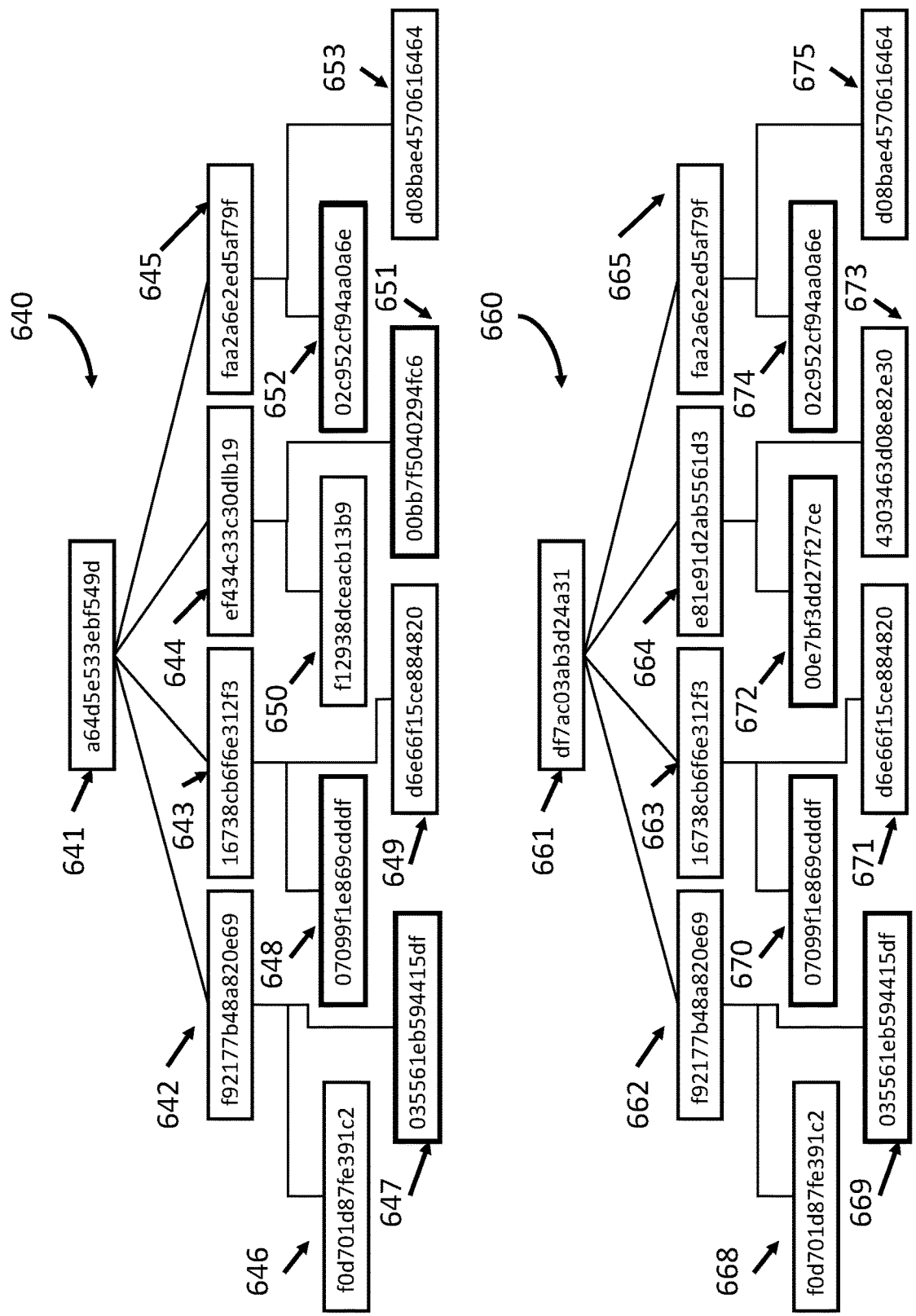
Figure 6C:
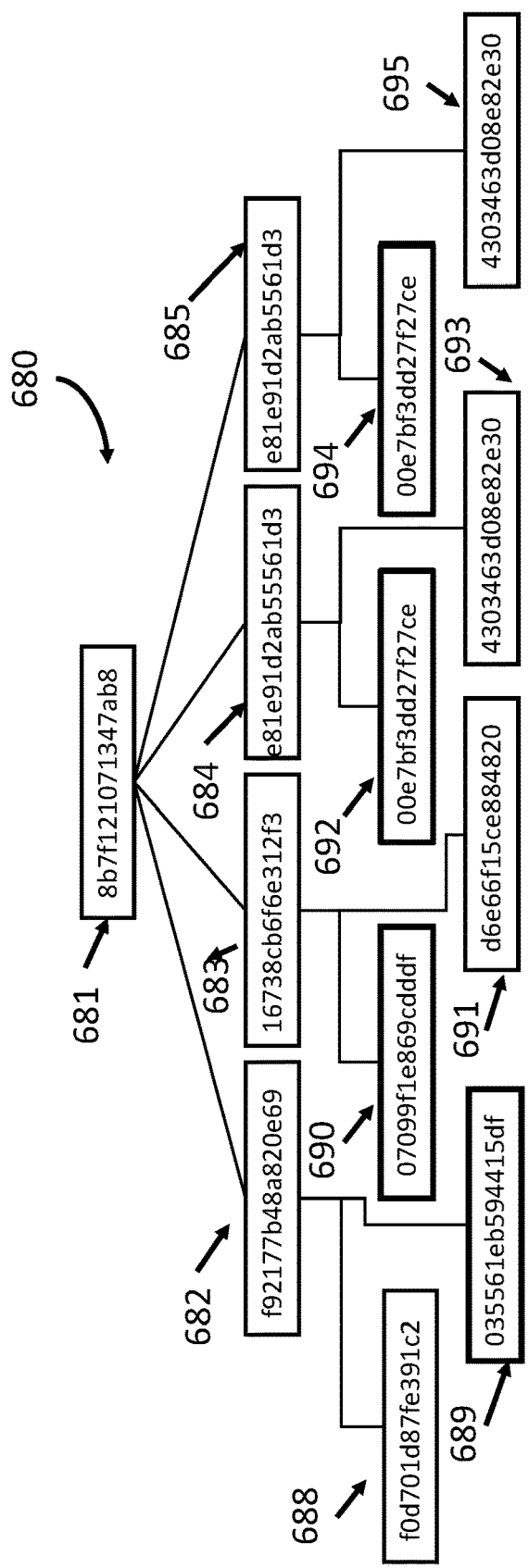

FIGS. 6A-6C provide conceptual illustrations of example trees that can be the basis of corresponding milli-indices. A milli-index can be considered an example of a multiset. The example of FIGS. 6A-6C provides a set of trees (e.g., 600, 620, 640, 660, 680) associated with milli-indices.

The example of FIGS. 6A-6C are based on 8-byte hashes, but hashes of any size can be supported. Further, the example of FIGS. 6A-6C are based on a sample rate of 1/N where N=2, which means that the milli-index will contain about one of every two data hashes. Any value can be utilized for N, including, for example, values that are on the order of hundreds or thousands. The specific value for N can be chosen, for example, to be space efficient while still providing the desired benefits.

The example of FIGS. 6A-6C are based on a model that truncates the hash at two bytes (16 bits); however, any truncation level can be utilized. The example further assumes that each data object is 8 KiB in size, but any size can be supported.

In the example trees of FIGS. 6A-6C, each tree includes a root node (e.g., node 601 in tree 600, node 621 in tree 620, node 641 in tree 640, node 661 in tree 660, node 681 in tree 680). The example trees in FIGS. 6A-6C are simplified with only three levels, but tree structures of any complexity can be supported. Each tree includes one or more intermediate nodes (e.g., nodes 602-605 in tree 600, nodes 622-625 in tree 620, nodes 642-645 in tree 640, nodes 662-665 in tree 660, nodes 682-685 in tree 680).

Further, each tree includes one or more leaf nodes (e.g., nodes 606-613 in tree 600, nodes 626-633 in tree 620, nodes 646-653 in tree 640, nodes 668-675 in tree 660, nodes 688-695 in tree 680). A subset of the leaf nodes can be sampled based on the specified sampling strategy. Utilizing the 1/N, where N=2 example strategy, nodes 606, 609, 611, 612, 627, 629, 631, 632, 647, 648, 651, 652, 669, 670, 672, 674, 689, 690, 692 and 694 are sampled.

As the result of sampling, the milli-index for tree 600 is:

| Truncated Hash | Reference Count |
|---|---|
| 005c | 1 |
| 0a6e | 1 |
| 4fc6 | 1 |
| B8ec | 1 |

The milli-index for tree 620 is:

| Truncated Hash | Reference Count |
|---|---|
| 005c | 1 |
| 0a6e | 1 |
| 15df | 1 |
| 4fc6 | 1 |

The milli-index for tree 640 is:

| Truncated Hash | Reference Count |
|---|---|
| 0a6e | 1 |
| 15df | 1 |
| 4fc6 | 1 |
| dddf | 1 |

The milli-index for tree 660 is:

| Truncated Hash | Reference Count |
|---|---|
| 0a6e | 1 |
| 15df | 1 |
| 27ce | 1 |
| dddf | 1 |

The milli-index for tree 680 is:

| Truncated Hash | Reference Count |
|---|---|
| 15df | 1 |
| 27ce | 2 |
| dddf | 1 |

The resulting node milli-index is:

| Truncated Hash | Reference Count |
|---|---|
| 005c | 2 |
| 0a6e | 4 |
| 15df | 4 |
| 27ce | 3 |
| 4fc6 | 3 |
| b8ec | 1 |
| dddf | 3 |

Given the trees and tables representing milli-indices described above, capacity information can be estimated based on evaluation of the table data. For example, to determine how much space can be reclaimed by deleting a single tree (e.g., tree 600), the reference count for each object in the specified tree is subtracted from the same objects in the node milli-index:

| Trunc. Hash | Node Ref. Count | − | Tree 600 Ref. Count | = | Multiset Diff. Ref. Count |
|---|---|---|---|---|---|
| 005c | 2 | | 1 | | 1 |
| 0a6e | 4 | | 1 | | 3 |
| 4fc6 | 3 | | 1 | | 2 |
| b8ec | 1 | | 1 | | 0 |

For an object to be reclaimed, the tree reference count must match the node reference count. In other words, the multiset difference reference count must be zero.

In some embodiments, in order to get the expected space reclamation estimate from deleting tree 600, the number of unique objects in the tree is extrapolated based on the number of unique samples in the tree milli-index:

|Tree 600 milli-index samples|*$N$=4 unique sampled objects*2=8 unique objects

Given the multiset difference reference counts above, deleting tree 600 will free the object with the truncated hash "b8ec" as its multiset difference reference count will go to zero in the node milli-index. Thus, one of four unique objects would be freed. Applying this ratio to the extrapolated number of unique blocks in the tree:

(1 object freed/4 unique sampled objects)*8 unique objects*8 KiB per object=16 KiB reclaimed As another example, to determine how much space can be reclaimed by deleting a different single tree (e.g., tree 680), the reference count for each object in the specified tree is subtracted from the same objects in the node milli-index:

| Trunc. Hash | Node Ref. Count | − | Tree 680 Ref. Count | = | Multiset Diff. Ref. Count |
|---|---|---|---|---|---|
| 15df | 4 | | 1 | | 3 |
| 27ce | 2 | | 2 | | 0 |
| dddf | 3 | | 1 | | 2 |

For an object to be reclaimed, the tree reference count must match the node reference count.

In some embodiments, in order to get the expected space reclamation estimate from deleting tree 680, the number of unique objects in the tree is extrapolated based on the number of unique samples in the tree milli-index:

|Tree 680 milli-index samples|*$N$=3 unique sampled objects*2=6 unique objects

Given the multiset difference reference counts above, deleting tree 600 will free the object with the truncated hash "27ce" as its multiset difference reference count will go to zero in the node milli-index. Thus, one of three unique objects would be freed. Applying this ratio to the extrapolated number of unique blocks in the tree:

(1 object freed/3 unique sampled objects)*6 unique objects*8 KiB per object=16 KiB reclaimed As a more complex example, these techniques can be utilized to estimate the reclaimable space from deleting two trees (e.g., tree 600 and tree 620). In some embodiments, the reference counts are first summed across the milli-indices for the trees and the result is subtracted from the corresponding objects in the node milli-index. The multiset reference counts from the union of all objects included in the individual trees:

| Trunc. Hash | Tree 600 Ref. Count | + | Tree 620 Ref. Count | = | Multiset Union Ref. Count |
|---|---|---|---|---|---|
| 005c | 1 | | 1 | | 2 |
| 0a6e | 1 | | 1 | | 2 |
| 15df | — | | 1 | | 1 |
| 4fc6 | 1 | | 1 | | 2 |
| b8ec | 1 | | — | | 1 |

Difference between the node milli-index reference counts and the multiset union reference counts to determine how many objects would be reclaimed:

| Trunc. Hash | Node Ref. Count | − | Multiset Union Ref. Count | = | Multiset Diff. Ref. Count |
|---|---|---|---|---|---|
| 005c | 2 | | 2 | | 0 |
| 0a6e | 4 | | 2 | | 2 |
| 15df | 4 | | 1 | | 3 |
| 4fc6 | 3 | | 2 | | 1 |
| b8ec | 1 | | 1 | | 0 |

As above, for an object to be reclaimed, the multiset union of the tree reference counts must match the node reference count.

In some embodiments, in order to get the expected space reclamation estimate from deleting trees 600 and 620, the number of unique objects in the tree is extrapolated based on the number of unique samples in the multiset union of the tree milli-indices:

|Multiset Union milli-index samples|*$N$=5 unique sampled objects*2=10 unique objects Given the multiset difference reference counts above, deleting trees 600 and 620 will free the objects with the truncated hashes "005c" and "b8ec" as its multiset difference reference count will go to zero in the node milli-index. Thus, two of five unique objects would be freed. Applying this ratio to the extrapolated number of unique blocks in the set of trees:

(2 objects freed/5 unique sampled objects)*10 unique objects*8 KiB per object=32 KiB reclaimed In some embodiments, for virtual machine disk (VMDK) and virtual hard disk (VHDX) files (and possibly other files that grow larger than, for example, 64 MiB), an Inode milli-index can be maintained. In these embodiments, for the rest of the hive, another hive milli-index can be maintained.

In one embodiment, the hive milli-index(es) and the Inode milli-index(es) are primarily updated during rollup, for example, to avoid excessive updating, they are stored within the hive, they are affined to each Inode for virtual disk files and other very large files, the choice of which files to affine these indices could be based on, for example, which filename extensions are most likely to be involved in server-side copy operations, and for the rest of the hive, the hive milli-index can be affine to Inode 0 or 2. In some implementations Inode 2 represents the root directory of the filesystem.

In one embodiment, when a snapshot or backup is taken, the snapshot (or backup) will inherit the hive milli-index and all Inode milli-index(es). In one embodiment, when a client, such as a hypervisor management system, requests a server-offloaded copy of an Inode, the copy of the file inherits the original file's Inode milli-index. This Inode milli-index is applied to the node milli-index(es) to accurately track a deep reference count for each of the sampled signatures in the copied file. This can be done in the same persistent manner as described for snapshot operations.

In one embodiment, when unlink, rmdir or truncate operations are performed, hive or Inode milli-indices are updated. In one embodiment, a milli-index can be maintained per Inode and rolled up as part of the directory structure so that at any given time an estimate of the directory, sub-directory or Inode usage could be given. When an Inode is removed, the sampled signatures present in the Inode milli-index have their deep reference counts decremented from the node milli-index.

In some embodiments, a milli-index is maintained for each node in an environment. The node milli-index can be updated whenever a hive milli-index operation on the node is performed.

As one implementation example, in a node with 32 TiB of data compressed 2:1, and the data object size is 8 KiB, where N=13 and M=64, the node milli-index contains approximately $2^{(1+45-(13+13))}$ signatures or approximately 1 million. The reduced-size signatures themselves should consume approximately 8 MiB. The chance of a collision is sufficiently low if the $\log_2$ of the number of signatures in the node milli-index is less than M/2.

In some embodiments, the node milli-index(es) can be retrieved via a representational state transfer (REST) application program interface (API). In some embodiments, the presence or absence of a hive milli-index signature within a node milli-index can be determined via the same API. Once retrieved, for example, via the REST API, the milli-index(es) can be treated as multisets, which implies union and difference operations are valid.

Utilizing the techniques and structures described herein, one or more of the following evaluations can be performed. The amount of storage space that could be freed/reclaimed by deleting a backup can be determined. For example, comparing the backup's milli-index against the node's milli-index can provide this information. In another example comparing a backup against both the next backup and the previous backup, the amount of space that could be freed by deleting the backup could be determined.

As an extension, the amount of space that could be freed/reclaimed by deleting a set of backups could be determined. As another example, the set of backups that meet specified criteria in terms of freeing storage space could be determined. The consequences of moving one or more virtual machines between nodes could be determined. The rate of change of contents on a hive could be determined. Other evaluations can also be performed.

Figure 7:
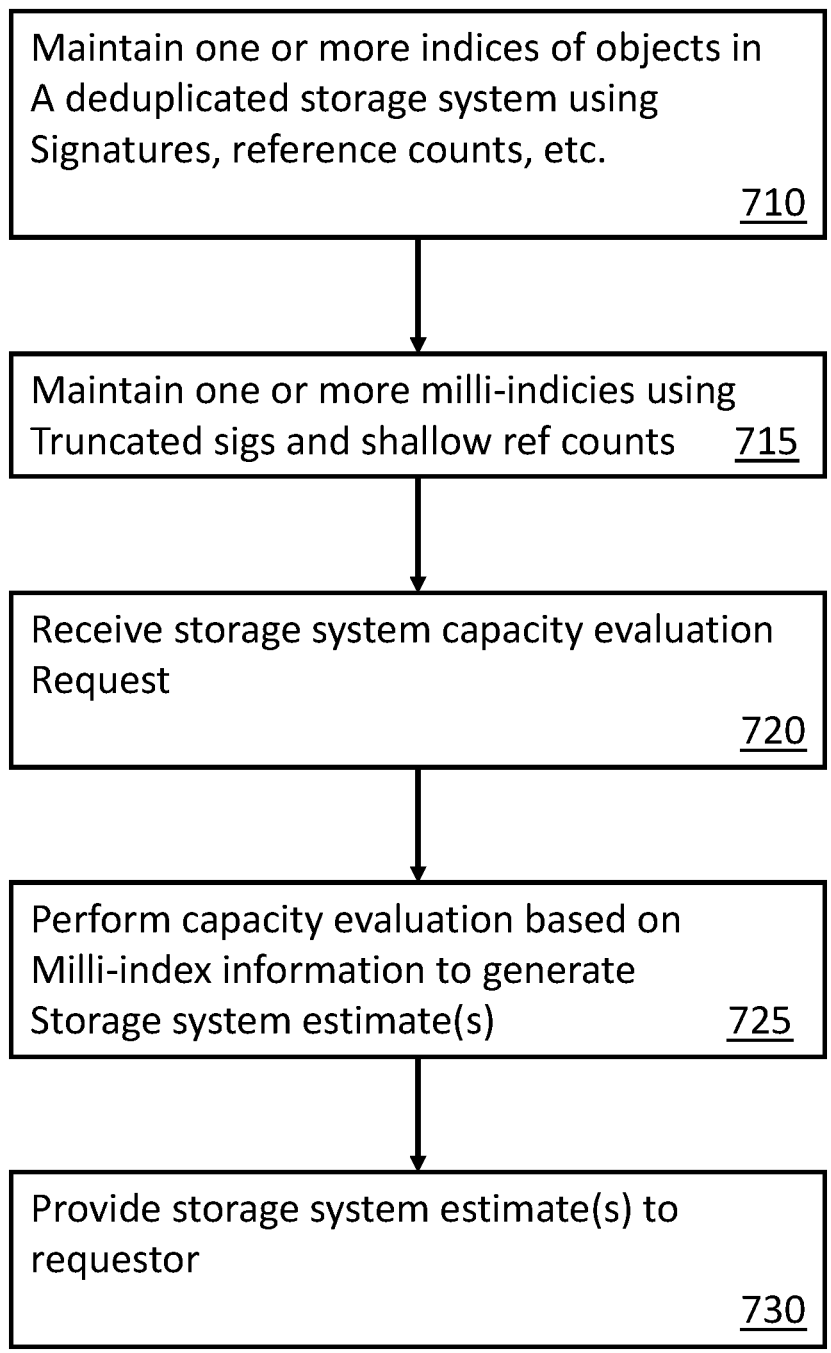
FIG. 7 is a flow diagram of one technique for estimating system storage capacity utilizing milli-indices and deep reference count information.

FIG. 7 is a flow diagram of one technique for estimating system storage capacity utilizing milli-indices and deep reference count information. As discussed above, the storage system providing storage capacity for any number of objects can be a deduplicated system. Additional techniques (e.g., compression) can also be utilized.

The system maintains one or more indices of objects stored in the system (block 710). Index entries include signatures corresponding to the objects and shallow reference counts for the objects. The index entries can also include additional information.

The system also maintains milli-indices for a subset of objects stored in the system (block 715). The milli-index entries utilize truncated signature values and deep reference counts. The shallow reference counts indicate the number of parent metadata objects that hold a reference to the object, and not how many trees hold a reference to the object. Deep reference counts represent the number of logical occurrences of an object within a tree or node.

The system can receive a storage system capacity evaluation request (block 720). The evaluation request can be, for example, how much reclaimable space exists in a specified dataset stored within a particular node. More complex evaluations can also be performed, for example, the consequences of deleting multiple datasets from a node or moving a dataset to a different node in the system. Many different types of evaluations can be performed.

The capacity evaluations are performed utilizing the milli-index information to generate storage system estimates (block 725). As discussed above, the estimates can be based on sampling and statistical modeling. The resulting estimates can be provided to the requestor (block 730).

As an outcome of system capacity evaluation requests, it may be desirable to migrate a dataset tree from one node to another to improve overall cluster capacity utilization. In some embodiments, this will involve a two-step process: first to write the dataset to the destination node, and then to delete it from the source node. New tree milli-index(es) will be generated on the destination node, along with the corresponding updates to the node milli-index(es). Deleting the dataset tree from first node will also require subtracting the associated milli-index(es) from the node milli-index(es) reference counts. This is an atomic operation and may use deferred reference count persistence as described for snapshot deletions.

Figure 5:
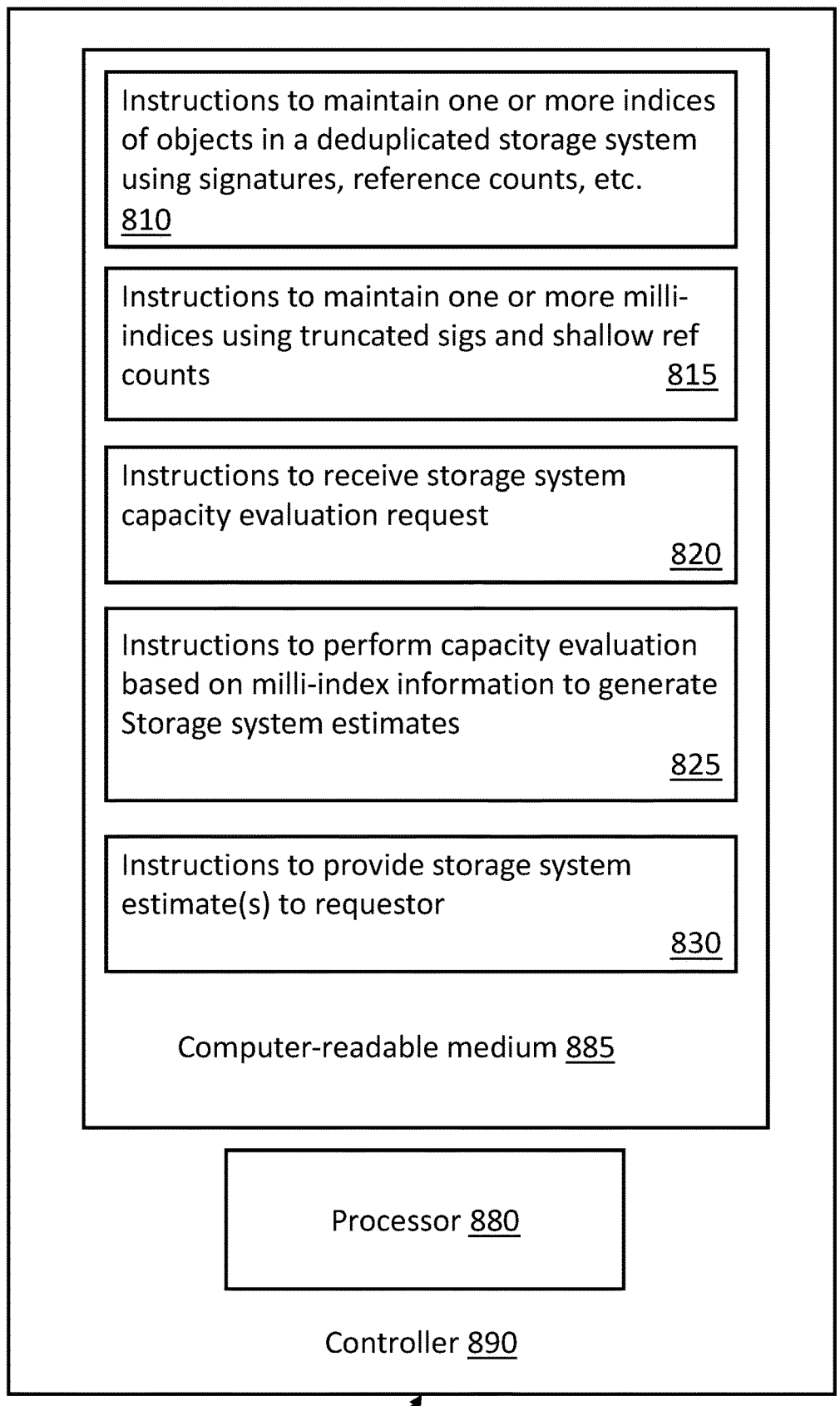
FIG. 5 is a computer-readable medium having instructions to provide one technique for estimating system storage capacity utilizing milli-indices and deep reference count information.

FIG. 5 is a computer-readable medium having instructions to provide one technique for estimating system storage capacity utilizing milli-indices and deep reference count information. In the example embodiment, system 800 includes processor 880 and computer readable medium 885 communicatively coupled, for example, through a system bus (not illustrated in FIG. 8). Processor 880 may be any type of Central Processing Unit (CPU), microprocessor, or processing logic that interprets and executes machine-readable instructions stored in computer readable storage medium 885.

Computer readable storage medium 885 may be a random access memory (RAM) or another type of dynamic storage device that may store information and computer readable instructions that may be executed by processor 880. For example, computer readable storage medium 885 may be Synchronous DRAM (SDRAM), Double Data Rate (DDR), Rambus DRAM (RDRAM), Rambus RAM, non-volatile memory (NVM), etc. or storage memory media such as a hard disk, a RAID array, a DVD, and the like. In some examples, computer readable storage medium 885 may be a non-transitory computer-readable medium. In some examples, computer readable storage medium 885 may be remote but accessible to system 800.

Computer readable storage medium 885 may store instructions 810, 815, 820, 825 and 830. In some examples, instructions 810 may be executed by processor 880 to maintain one or more indices in a deduplicated storage system. The indices can include signatures, shallow reference counts and/or additional information. Instructions 815 may be executed by processor 880 to maintain one or more milli-indices using truncated signatures and deep reference counts.

Instructions 820 may be executed by the processor 880 to receive a storage system capacity evaluation request. Instructions 825 may be executed by processor 880 to perform the requested capacity evaluation utilizing the milli-indices and the information stored therein. Instructions 830 may be executed by processor 880 to return the results of the capacity estimation to the requestor.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A system comprising:
    a storage system to store data, the storage system to deduplicate the data stored in the storage system and to maintain an index of objects in an object store, each respective object of the objects associated with a corresponding object signature value and a corresponding shallow reference count in the index, the corresponding shallow reference count indicating a number of parent objects that hold a reference to the respective object; and
    one or more hardware processors to execute instructions stored on a machine-readable storage medium to:
        maintain a milli-index having entries corresponding to a subset of the objects referenced by the index, the entries having truncated object signature values and deep reference count values for corresponding objects of the subset of the objects, each respective truncated object signature value of the truncated object signature values in the milli-index being truncated from a respective object signature value in the index, and the respective truncated object signature in the milli-index having less bits than the respective object signature value in the index, each deep reference count value of the deep reference count values indicating a number of logical occurrences of an associated object, and
        determine a capacity utilization of the storage system based on an analysis utilizing the deep reference count values from the milli-index.

2. The system of claim 1, wherein the milli-index is a tree milli-index associated with a respective tree structured file system, and wherein the one or more hardware processors are to:
    maintain a node milli-index; and
    in response to a snapshot of the tree structured file system, update the node milli-index based on the tree milli-index by incrementing reference counts in the node milli-index based on the entries in the tree milli-index.

3. The system of claim 1, wherein the milli-index is a tree milli-index associated with a respective tree structured file system, and wherein the one or more hardware processors are to:
    maintain a node milli-index; and
    in response to deleting a snapshot of the tree structured file system, update the node milli-index based on the tree milli-index by subtracting reference counts in the node milli-index based on the entries in the tree milli-index.

4. The system of claim 1, wherein the analysis comprises estimating a storage capacity to be regained on a first storage node and consumed on a second storage node as a result of moving objects from the first storage node to the second storage node.

5. The system of claim 1, wherein the subset of the objects is less than all of the objects referenced by the index.

6. The system of claim 1, wherein the milli-index is a tree milli-index associated with a respective tree structured file system including the objects referenced by the index, and wherein the one or more hardware processors are to:
    maintain a node milli-index that is an aggregate of the tree milli-index and at least one other tree milli-index.

7. The system of claim 6, wherein the determining of the capacity utilization of the storage system based on the analysis utilizing the deep reference count values from the milli-index uses deep reference count values of the node milli-index.

8. The system of claim 6, wherein a given entry of the tree milli-index has a first truncated object signature value and an associated deep reference count value, and a given entry of another tree milli-index has the first truncated object signature value and an associated deep reference count value, and wherein an entry of the node milli-index includes the first truncated object signature value and a sum of the associated deep reference count value in the given entry of the tree milli-index and the associated deep reference count value in the given entry of the another tree milli-index.

9. A non-transitory computer-readable medium comprising instructions that upon execution cause a system to:
    maintain an index of objects in a storage system, the storage system to deduplicate data stored in the storage system, each respective object of the objects associated with a corresponding object signature value and a corresponding shallow reference count in the index, the corresponding shallow reference count indicating a number of parent objects that hold a reference to the respective object;
    maintain a milli-index having entries corresponding to a subset of the objects referenced by the index, the entries having truncated object signature values and deep reference count values for corresponding objects of the subset of the objects, each respective truncated object signature value of the truncated object signature values in the milli-index being truncated from a respective object signature value in the index, and the respective truncated object signature in the milli-index having less bits than the respective object signature value in the index, each deep reference count value of the deep reference count values indicating a number of logical occurrences of an associated object; and determine a capacity utilization of the storage system based on an analysis utilizing the deep reference count values from the milli-index.

10. The non-transitory computer-readable medium of claim 9, wherein the milli-index is a tree milli-index associated with a respective tree structured file system including the objects referenced by the index, and wherein the instructions upon execution cause the system to:

maintain a node milli-index; and in response to a snapshot of the tree structured file system, update the node milli-index based on the tree milli-index by incrementing reference counts in the node milli-index based on the entries in the tree milli-index.

11. The non-transitory computer-readable medium of claim 9, wherein the milli-index is a tree milli-index associated with a respective tree structured file system including the objects referenced by the index, and wherein the instructions upon execution cause the system to:

maintain a node milli-index; and in response to deleting a snapshot of the tree structured file system, update the node milli-index based on the tree milli-index by subtracting reference counts in the node milli-index based on the entries in tree milli-index.

12. The non-transitory computer-readable medium of claim 9, wherein the subset of the objects is less than all of the objects referenced by the index.

13. The non-transitory computer-readable medium of claim 9, wherein the milli-index is a tree milli-index associated with a respective tree structured file system, and wherein the instructions upon execution cause the system to:

maintain a node milli-index that is an aggregate of the tree milli-index and at least one other tree milli-index.

14. The non-transitory computer-readable medium of claim 13, wherein the determining of the capacity utilization of the storage system based on the analysis utilizing the deep reference count values from the milli-index uses deep reference count values of the node milli-index.

15. The non-transitory computer-readable medium of claim 13, wherein a given entry of the tree milli-index has a first truncated object signature value and an associated deep reference count value, and a given entry of another tree milli-index has the first truncated object signature value and an associated deep reference count value, and wherein an entry of the node milli-index includes the first truncated object signature value and a sum of the associated deep reference count value in the given entry of the tree milli-index and the associated deep reference count value in the given entry of the another tree milli-index.

16. A method performed by a system comprising a hardware processor, the method comprising:

maintaining an index of objects in a storage system, the storage system to deduplicate data stored in the storage system, each respective object of the objects associated with a corresponding object signature value and a corresponding shallow reference count in the index, the corresponding shallow reference count indicating a number of parent objects that hold a reference to the respective object;

maintaining a milli-index having entries corresponding to a subset of the objects referenced by the index, the entries having truncated object signature values and deep reference count values for corresponding objects of the subset of the objects, each respective truncated object signature value of the truncated object signature values in the milli-index being truncated from a respective object signature value in the index, and the respective truncated object signature in the milli-index having less bits than the respective object signature value in the index, each deep reference count value of the deep reference count values indicating a number of logical occurrences of an associated object; and determining a capacity utilization of the storage system based on an analysis utilizing the deep reference count values from the milli-index.

17. The method of claim 16, wherein the milli-index is a tree milli-index associated with a respective tree structured file system, the method comprising:

maintaining a node milli-index; and in response to a snapshot of the tree structured file system, updating the node milli-index based on the tree milli-index by incrementing reference counts in the node milli-index based on the entries in the tree milli-index.

18. The method of claim 16, wherein the milli-index is a tree milli-index associated with a respective tree structured file system, the method comprising:

maintaining a node milli-index; and in response to deleting a snapshot of the tree structured file system, updating the node milli-index based on the tree milli-index by subtracting reference counts in the node milli-index based on the entries in the tree milli-index.

19. The method of claim 16, wherein the milli-index is a tree milli-index associated with a respective tree structured file system, the method comprising:

maintaining a node milli-index that is an aggregate of the tree milli-index and at least one other tree milli-index.

20. The method of claim 19, wherein the determining of the capacity utilization of the storage system based on the analysis utilizing the deep reference count values from the milli-index uses deep reference count values of the node milli-index.

21. The method of claim 19, wherein a given entry of the tree milli-index has a first truncated object signature value and an associated deep reference count value, and a given entry of another tree milli-index has the first truncated object signature value and an associated deep reference count value, and wherein an entry of the node milli-index includes the first truncated object signature value and a sum of the associated deep reference count value in the given entry of the tree milli-index and the associated deep reference count value in the given entry of the another tree milli-index.

* * * * *